United States Patent
Echols et al.

(10) Patent No.: US 6,815,686 B1
(45) Date of Patent: Nov. 9, 2004

(54) METHOD AND APPARATUS FOR UV MEASUREMENT

(75) Inventors: Stanley D. Echols, Birmingham, AL (US); Ronald Rahn, Birmingham, AL (US)

(73) Assignee: Riverbend Instruments, Inc., Birmingham, AL (US)

(*) Notice: Subject to any disclaimer, the term of this patent is extended or adjusted under 35 U.S.C. 154(b) by 0 days.

(21) Appl. No.: 09/940,109

(22) Filed: Aug. 27, 2001

Related U.S. Application Data

(60) Provisional application No. 60/228,619, filed on Aug. 28, 2000.

(51) Int. Cl.[7] ................................ G01J 1/50
(52) U.S. Cl. ........................ 250/372; 250/474.1
(58) Field of Search ........................ 250/372, 474.1

(56) References Cited

U.S. PATENT DOCUMENTS

| | | | | |
|---|---|---|---|---|
| 1,845,835 A | * | 2/1932 | Frankenburger et al. | 250/372 |
| 3,710,109 A | * | 1/1973 | Chalkley | 250/474.1 |
| 4,382,226 A | * | 5/1983 | Suga | 324/94 |
| 5,036,311 A | | 7/1991 | Moran et al. | |
| 5,289,547 A | * | 2/1994 | Ligas et al. | 283/72 |
| 5,436,115 A | | 7/1995 | Mullis | |
| 6,067,855 A | * | 5/2000 | Brown et al. | 73/308 |

FOREIGN PATENT DOCUMENTS

WO    WO 02/068917 A2  *  6/2002

OTHER PUBLICATIONS

Rahn, Ronald, Potassium Iodide as a Chemical Actinometer for 254 nm Radiation: Use of Iodate as an Electron Scavenger, (1997) Photochemistry and Photobiology, 66(4), pp. 450–455.*

* cited by examiner

*Primary Examiner*—Albert Gagliardi
(74) *Attorney, Agent, or Firm*—Smith, Gambrell & Russell, LLP

(57) ABSTRACT

A spherical actinometer integrates the omnidirectional radiant flux over time to obtain the radiant energy or fluence incident on the sphere utilizing a small spherical vessel containing a solution that responds to germicidal radiation but not ambient room light. In one embodiment the actinometric solution, is an aqueous mixture of iodide and iodate that is optically opaque at 254 nm but insensitive radition above 330 nm. The UV-induced formation of triiodide, is facilitated by the presence of iodate that acts as an electron acceptor. The formation of triiodide, which is easily measured spectroscopically with a photometer, occurs with a quantum yield of 0.75 for 254 nm radiation at 21° C. The actinometeric measurement of UV fluence using the system is substantially independent of the size of the measuring device.

9 Claims, 4 Drawing Sheets

METHOD AND APPARATUS FOR UV MEASUREMENT

This Application Claims Priority from Provisonal Patent Application 60/228,619 Filed Aug. 28, 2000

FIELD OF THE INVENTION

The present invention relates to a method and apparatus for measuring germicidal (254 nm) ultraviolet radiation (GUVR) in an omnidirectional manner. More particularly the invention relates to those situations in which GUVR from more than one direction or source impinges on a three-dimensional object, and when it is of interest to determine the radiant fluence experienced by the object. In greater particularity the present invention employs spherical UV transmissive vessels constructed of varying outside diameter and filled with an actinometric solution. More particularly, the present invention relates to the use of spherical actinometers which may be read in situ or in a lab environment.

BACKGROUND OF THE INVENTION

Upper room germicidal (254 nm) UV radiation (GUVR) air disinfection is becoming more widely used for the control of infectious diseases caused by airborne microorganisms such as tuberculosis. Ultraviolet air disinfection has been proposed for use in healthcare facilities and where persons with unrecognized active disease may be present. Although epidemiological studies have shown that UV air disinfection can reduce disease transmission, measurements of UV air disinfection in real-life settings are limited. Low-pressure mercury-vapor lamps used for germicidal application emit approximately 85% of their radiant flux at 254 nm, which is part of the UVC spectrum. The optimal wavelength for air disinfection ranges from 250 to 270 nm, depending upon the microorganism. These lamps are placed near the ceiling and arranged 5–10 feet apart such that the upper room volume is subjected to the germicidal action of the lamp outputs. Baffles and louvers are employed to minimize the amount of GUVR present in the lower portion of the room because overexposure can cause skin and eye irritation. The degree of killing in the room air is a function of the average energy distribution of the GUVR in the upper portion of the room with the provision that exchange of air between the upper and lower portions of the room readily occurs.

For a given arrangement of lamps, there is a need to measure accurately the distribution of GUVR in the upper portion of the room where killing occurs. Normally, for radiation from a sole source, an electronic meter or radiometer is used to measure the irradiance (power delivered per unit area) at the surface of the target, which is assumed to be a planar surface. The irradiance from a given source varies with the cosine of the angle of incidence and radiometer detectors are designed to take this angular dependence into account. However, for purposes of estimating the amount of energy available for killing microorganisms, where the irradiation is from several sources (omni-directional) and the target is three dimensional, the use of irradiance is no longer an option. Instead, the metric of fluence rate must be used, that is the omni-directional radiant flux passing through the cross-sectional area of a small sphere located at some point in space. Such a measurement requires a detector with spherical rather than planar geometry in order to match the geometry of the irradiated object. In this case, energy from all directions is measured equally, the cross-sectional area of the sphere taken as the area of exposure. For the case of irradiation from a single source, located distant from the target such that the radiation is perpendicular to the surface, the fluence rate and the irradiance are the same, the units being watts per unit area. The measurement of fluence rate with a cosine-corrected detector is a conceptual impossibility for anything but collimated (i.e. parallel) radiation at normal incidence.

This problem of measuring radiation in a spherical or non-labertian manner has been addressed previously by Middleton who designed a spherical integrator or illuminometer for operation in the visible portion of the spectrum. More recently, Cabaj and Sommer described the use of a spherical quartz vessel containing *Bacillus subtilis* spores to measure either UVC or solar radiation. The vessel used was much larger than that described here and was not satisfactory for measuring UVC unless the suspension of spores was well mixed during irradiation.

SUMMARY OF THE INVENTION

It is an object of the invention to provide a method for simultaneously measuring the UV fluence at a number of points in space subjected to the combined output of an array of germicidal lamps positioned so as to disinfect the upper room air. Such spherical or 4p measurements provide a more accurate estimate of the energy to which a three-dimensional object such as a microorganism would be exposed in contrast to the energy estimates obtained using a meter or radiometer.

It is another object of the present invention to provide a readily usable spherical actinometer for use in an omnidirectional environment and a methodology for the use of the same. To accomplish these objects the present invention utilizes a device that integrates the omnidirectional radiant flux over time to obtain the radiant energy or fluence incident on the sphere. This spherical actinometer consists of a small spherical vessel containing a solution that responds to germicidal radiation but not ambient room light. In one embodiment the actinometric solution, is an aqueous mixture of iodide and iodate that is optically opaque at 254 nm but insensitive to radiation above 330 nm. The UV-induced formation of triiodide, $$I^- + h\nu > I^* + e^{31}$$  (1)

$$I^* + e^- > I^-$$  (1a)

$$2I^* + I^- = I_3^-$$  (2)

is facilitated by the presence of iodate that acts as an electron acceptor and prevents the back reaction shown in Eq. 1a. The formation of triiodide (Eq. 2), which is easily measured spectroscopically with a photometer described herein, occurs with a quantum yield of 0.75 for 254 nm radiation at 21° C.

Another object of the invention is to provide a device for measurement of UV fluence which is substantially independent of the size of the measuring device. This is accomplished in the instant invention by measuring directly in the spherical vessel forming the actinometer due to the relationship of the concentration of the photoproduct to the cross-sectional area of the sphere divided by the volume or 1/r and to the fact that absorbance varies directly in proportion to r.

BRIEF DESCRIPTION OF THE DRAWINGS

Apparatus embodying features of the invention and the method of using the invention are more readily understood with reference to the appended drawings which form a portion of the disclosure and wherein.

DESCRIPTION OF THE PREFERRED EMBODIMENTS

Figure 1:
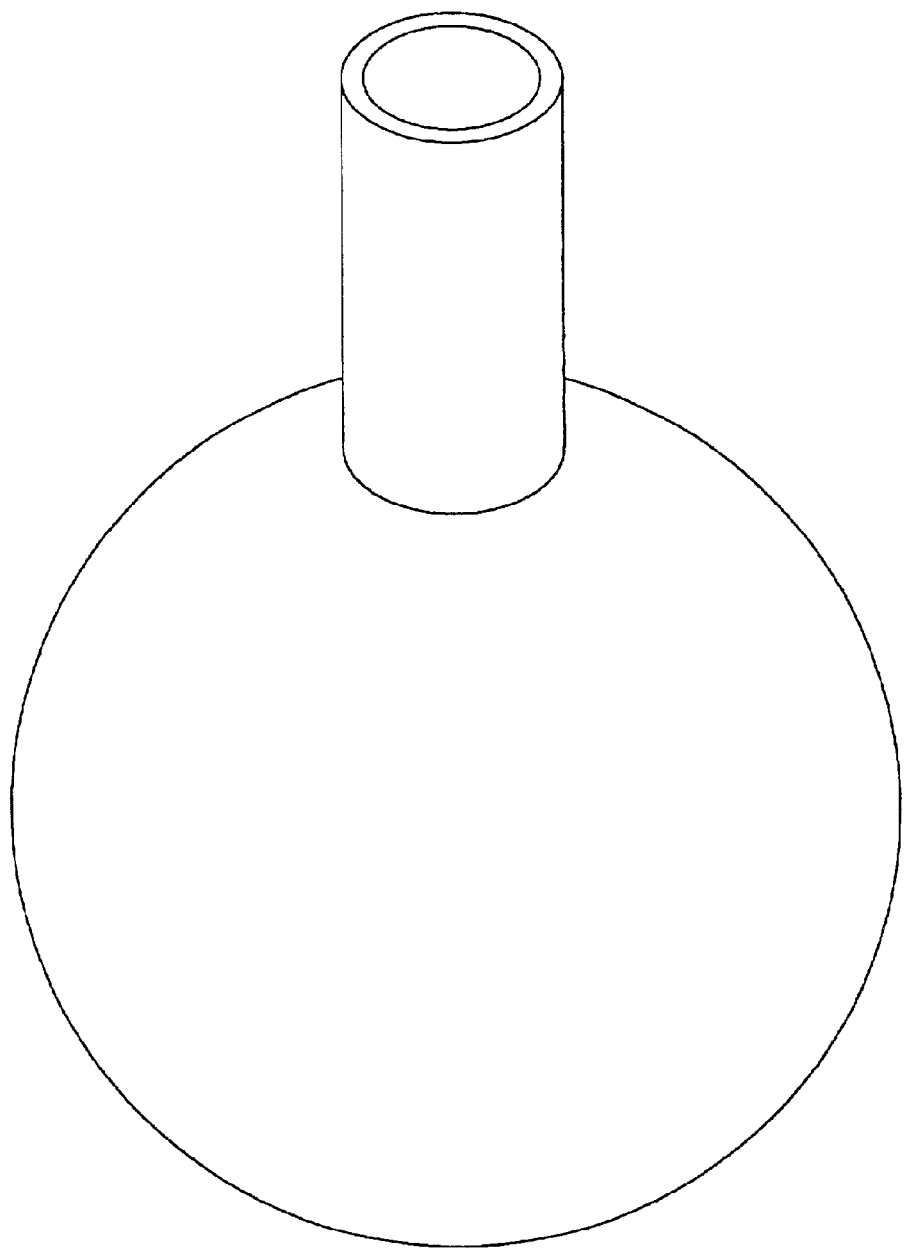
FIG. 1 is a side view of the actinometer.
Figure 2:
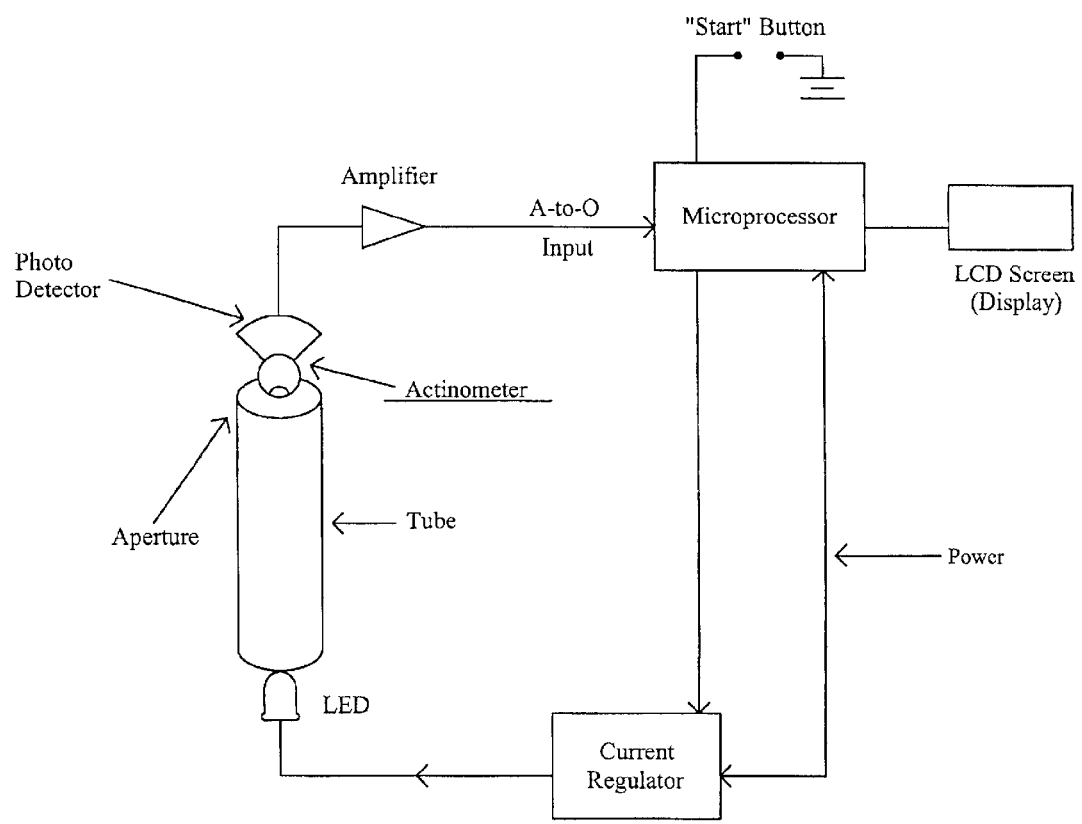
FIG. 2 is a block diagram of the photometer used with the spherical actinometer.

This spherical actinometer of the present invention comprises of a small spherical quartz vessel containing a solution that responds to germicidal radiation but not ambient room light. In a particular embodiment, the actinometric solution is an aqueous mixture of iodide and iodate that is optically opaque at 254 nm but insensitive to radiation above 330 mn. The UV-induced formation of triiodide,

  (1)

  (1a)

  (2)

is facilitated by the presence of iodate that acts as an electron acceptor and prevents the back reaction shown in Eq. 1a. The formation of triiodide (Eq. 2), which is easily measured spectroscopically, occurs with a quantum yield of 0.75 for 254 nm radiation at 21° C.

Spherical quartz cells were prepared in the glass shop at the University of Alabama, Tuscaloosa. Quartz tubing (4 mm outer diameter) was sealed at one end and blown out to form spheres having outside diameters of approximately 1.35 cm, 1.0 cm and 0.8 cm, referred to as the MAX, MED and MIN sizes, respectively. Approximately 3 cm of straight tubing was left attached to the spherical portion in order that solution could be added or removed from the sphere and that could serve as a shank or shaft for holding purposes. It may be necessary to mask off stem of vessel with opaque sleeve to eliminate unwanted photochemisty in the stem portion or fill the vessels so that liquid is only in the spherical portion of vessel. Assuming a spherical shape, the inside diameters of the actinometers can then be determined from the volume. From the diameters the cross-sectional areas were calculated and varied from 1.63 to 0.41 cm².

Actinometric solutions (0.6 M iodide and 0.1 M iodate in 0.01 M borate at pH 9.25) were prepared without further purification of the reagent-grade starting materials. A solution of potassium iodate in boric acid was first prepared and the pH raised to 9.25. This solution is stable for months. Then 1 g of potassium iodide was added to 10 mL of this solution. As is known, the mixture of iodide and iodate results in a shift in the absorbance toward the red due to an interaction between iodide and iodate. The absorbance of this solution at 254 nm is approximately 200 as determined using an optical cell with a 0.1 mm path length. At 300 nm the solution has an absorbance of 0.58 and is essentially zero at 320 nm. The absorbance at 300 nm varies linearly with the concentration of iodide as well as iodate. Hence, measurements at this wavelength of the unirradiated solution provide a measure of its concentration. Such a measure allows the user to feel confident that the solution has been made up to a standard concentration of iodide and iodate. The quantum yield is independent of iodate at this concentration but does show a slight dependence on the iodide concentration.

Experimentally, irradiation was done with a pair of horizontally positioned low-pressure mercury lamps (15 W) held in a conventional fluorescent lamp fixture. The plane of the front surface of the sample cell was parallel to that of the lamps and located directly opposite the center of the lamp at a distance of 39 cm. Two different modes of irradiation were compared. In one mode, the output along the entire length of the lamps was allowed to irradiate the sample. In the other case, the lamp housing was masked such that only light from a 10×10 cm² opening directly opposite the sample was used for irradiation. For this case, which begins to approach a collimated beam, the radiation as experienced by the sample is assumed to be approximately at right angles to the surface of the cell surface. The samples were suspended by their shafts and either irradiated stationary or rotating, the latter accomplished by attaching the shank of the cell to the shaft of a clock motor (1 rpm) mounted directly above the sample.

Irradiation experiments were also conducted at the Joint Center for Energy Management's Larson Building Systems Laboratory, University of Colorado at Boulder. The test facility is a 90 m³ room housed inside the laboratory with a floor-to-ceiling height of 2.44 m and a clear floor area of 37.1 m². The room has insulated walls of painted sheetrock, a raised floor, plenum ceiling with acoustic tiling, one door and no windows. A GUVR lamp system (Lumalier, Memphis, Tenn.) installed in the chamber consisted of five luminaries: four mounted in each corner of the room and one hung from the center of the ceiling. All the lamps in these luminaries are rated as 9 W, with 5.0 W of germicidal (254 nm) radiation. The center luminary provides a total of 27 W, consisting of three lamps. The corner luminaries provide a total of 18 W each, consisting of two lamps that are installed with mirror parabolic aluminum reflectors on the backs of the luminaries. The lamps in each of these luminaries are 30 cm in length and are aligned vertically at the same height. The bottom of the luminaries is 2.18 m from the floor, and the top is at 2.48 m. All these luminaries are equipped with concentric black louvers resulting in a band of UV light with a width of 30 cm in the upper level of the room. The germicidal lamp system was operated for over 100 h before use in these experiments.

An International Light Radiometer, model IL1700 with an SEE240 detector and a quartz diffuser for cosine correction was used in the laboratory facility. This system was calibrated at 254 nm using 1 cm quartz rectangular cells filled with the KI actinometric solution. The cells during calibration were placed such that their front surface was at the same position as the front surface of the radiometer detector. At the test facility, a factory calibrated International Light radiometer model 1400 (International Light, Newburyport, Mass.) was used to measure the GUVR irradiance in the upper portion of the chamber. A side-by-side exposure of these two radiometers to the same source gave essentially the same irradiance response, demonstrating an internal consistency between the two measuring systems to within 10%.

Following irradiation, the contents of the spherical cells ranging from 0.2 mL to 0.1 mL were removed with a Pasteur pipet, the contents placed into optical absorbance cells and the resulting formation of triiodide determined spectrophotometrically. If it was necessary to dilute or increase the volume of the sample prior to measurement, the unirradiated actinometric solution was used for dilution purposes. All measurements were made against an unirradiated control taken as the blank in order to correct for any small changes in absorbance over time due to thermal oxidation. Such changes are on the order of 0.02–0.04 absorbance units per day at 352 nm. The number of moles of triiodide formed per radiation exposure is given by:

$$\text{triiodide (mol)} = (\text{Abs}_{352nm})(\text{vol dm}^3)(26400 \text{ mol}^{-1}\text{dm}^3)^{-1} \quad (3)$$

where $\text{Abs}_{352nm}$ is the absorbance change measured at 352 nm in a 1 cm path length cell, vol is the volume of the irradiation vessel and 26400 is the molar absorption coefficient of triiodide at 352 nm, the absorbance maximum.

For high doses, where the absorbance at 352 nm is 2.0 or greater, measurements at this wavelength become increasingly unreliable unless the sample is diluted. However, it is usually unnecessary to dilute the sample as several alternatives are available. One can make absorbance measurements at longer wavelengths where the extinction coefficient is less than that at 352 nm. For example, at 475 nm the extinction coefficient is 17 times less than it is at 352 nm. Therefore, the dose necessary to obtain an absorbance reading of 2.0 at this wavelength is 17 times greater than that necessary to obtain a reading of 2.0 at 352 nm. Alternatively, one can also use an optical cell with a shorter path length, 1 mm for example, and in this way allow measurements of doses 10 times greater than that possible with a 1 cm cell. As will be seen hereinafter, using a spherical actinometer and a specialized spectrophotometer it is not necessary to remove the solution from the cell for measurement.

From the definition of the quantum yield (F) as the moles of product formed per mole of photons or einsteins (E) absorbed, and the fact that the iodide/iodate actinometric solution absorbs all of the 254 nm photons, one writes $$E(J) = (4.72 \times 10^5 \text{ J/einstein})(\text{triiodide mol})(\emptyset \text{ mol/einstein}) \quad (4)$$

where E is the amount of energy absorbed by the sample and $4.72 \times 10^5$ corresponds to the number of joules in an einstein of 254 nm photons. Dividing the energy by the cross-sectional area in $\text{cm}^2$ of the vessel and substituting Eq. 3 for triiodide, one obtains an expression for the fluence L $$L(\text{J/cm}) = (4.72 \times 10 \text{ J/einstein})(\text{Abs}_{352nm})(\text{vol dm}^3) \times \\ (26400 \text{ mol}^{-1}\text{dm}^3)(\text{area cm}^2)(\emptyset \text{ mol/einstein})^{-1} \quad (5)$$

The quantum yield is temperature dependent and increases with increasing temperature. To take this dependence into account, the quantum yield is written as $$\emptyset = 0.75[1 - 0.003(T - 21)] \quad (6)$$

and should be used whenever the temperature is significantly different than 21° C. For the case where the temperature is 21° C., $\emptyset = 0.75$ as previously determined. Substituting this value into Eq. 5, and rearranging terms, one obtains $$L(\text{mJ/cm}) = (23.82 \text{ J/dm}^3)(\text{Abs}_{352nm})(1000 \text{ vol dm}^3)(\text{area cm}^2) - 1 \quad (7)$$

Hence, once the absorbance due to triiodide is measured, knowing the volume to area ratio, the fluence can be quickly determined using Eq. 7. Dividing Eq. 7 by the time of irradiation provides the fluence rate in mW/cm2.

Consider a spherical quartz vessel with volume V and cross-sectional area A filled with the actinometer solution and exposed to an unknown fluence L of germicidal radiation. The conversion of iodide to triiodide takes place with a quantum yield of 0.75 at 21° C. Because of the very high absorption of iodide at 254 nm, all of the photochemistry takes place in a very thin layer (0.1 mm) along the inside surface of the actinometer. Following GUVR exposure the contents of the vessel are removed, the absorbance measured and the total amount of triiodide determined. Hence, the final concentration of triiodide is a reciprocal function of the volume of the vessel that varies as $r^3$. On the other hand, the effective area of the sphere that intercepts the impinging radiation is taken to be the cross-sectional area of the sphere that varies as $r^2$. Therefore, for exposure of spherical actinometers of different sizes to the same amount of germicidal radiation, the variation in the final concentration of triiodide should be inversely proportional to r. This dependence, which is incorporated into Eq. 5 as the vol/area ratio, was tested using spherical actinometers of varying sizes.

The spherical portions of the actinometers were filled with the actinometric solution and subjected to irradiation under conditions where the cell was either stationary or rotating during irradiation, and the lamp was either masked or unmasked. Following irradiation, the contents of the vessels were removed, dilutions made if necessary, and the absorbance measured at 352 nm. The fluence was determined using Eq. 7 and compared with the irradiance as determined using a radiometer. The fluence as measured with the actinometer is divided by the irradiance as measured by the radiometer. This ratio is reasonably close to unity for all three radiation conditions and for all three actinometers, supporting the use of spherical actinometers for measuring omnidirectional radiant fluences and demonstrating that the cross-sectional area of the sphere is indeed a good approximation of the area intercepting the radiant energy.

Measurements Made in the Test Facility

Twenty actinometers were constructed with approximate outside diameters of 1 cm. The average of the volumes was 0.456 mL and they ranged from 0.40 mL to 0.54 mL. The actinometers were filled with actinometric solution and suspended at 20 evenly spaced locations within the test facility at a height of 2.26 m from the floor. Following exposures for either 30 or 90 min, the contents were measured in a spectrophotometer for triiodide formation and the fluence determined using Eq. 5 along with the appropriate temperature corrected value for F as the temperature in the room was 23° C. The long exposure times resulted in high concentrations of triiodide requiring the samples to be diluted prior to measuring the absorbance in 1 cm path length cells. The fluence rate peaks near the five luminaries, as expected, with a maximum value of 81–87 mW/cm 2 at the center and minimum values on the order of 23–26 mW/cm 2 for instances most remote from the luminaries. The fact that the 30 and 90 min measurements gave essentially the same result indicates that the response of the actinometric system is linear over this dose range. One can also average over all 20 points and obtain a pseudospatial average of the fluence rate. The true average would require a much more sophisticated calculation. The value of such an average is that it can be use as a metric to make comparisons. The pseudoaverage fluence rate was 42 and 44 mW/cm 2 for the 30 and 90 min exposures, respectively, demonstrating good consistency between the two measurements.

These results were compared with those obtained using the model 1400 IL radiometer, holding it by hand and taking measurements in six orthogonal directions. The readings were added together to obtain a final UV irradiance measurement. Measurements were made at the same 20 locations within the test facility, which was where the actinometer measurements were made. A comparison of these values with those obtained using the actinometer suggests that radiometer readings as obtained in this manner can closely approximate the actinometric measurements provided the measurements are made away from and/or equidistant to the luminaries. At closer distances the agreement is poorer. The larger differences at closer distances can be shown to be inherent in the manner in which the orthogonal axis system is chosen. At the closest distance to the center luminary, the sum of the six radiometer readings will vary by up to 60%, depending upon the orientation of the axis system. At a distance half-way between the center and corner luminary, this variation reduces to 20% or less, and radiometer readings taken in "six orthogonal directions" can provide a good first-order approximation to the fluence rate, although there is no basis, a priori, to choose which orientation of the axis system is the proper one to choose. These measurements highlight a distinct advantage to the spherical actinometer measurement: it is not dependent on orientation or location and can be used to make accurate GUVR measurements at all locations.

When one considers Beers law in relation to the above described spherical actinometers further advantages of the spherical actinometer become evident. The Beer-Lambert Law is expressed as A=ebc. Where A is absorbance, e is the molar absorbtivity with units of L mol−1 cm−1, b is the path length of the sample and c is the concentration of the compound in solution, expressed in mol L−1. With this equation absorbance is directly proportional to the other parameters, hence for a spherical actinometer b=2r across at the diameter of the actinometer and c varies as 1/r, hence Absorbance is independent of the size of the sphere.

Figure 3:
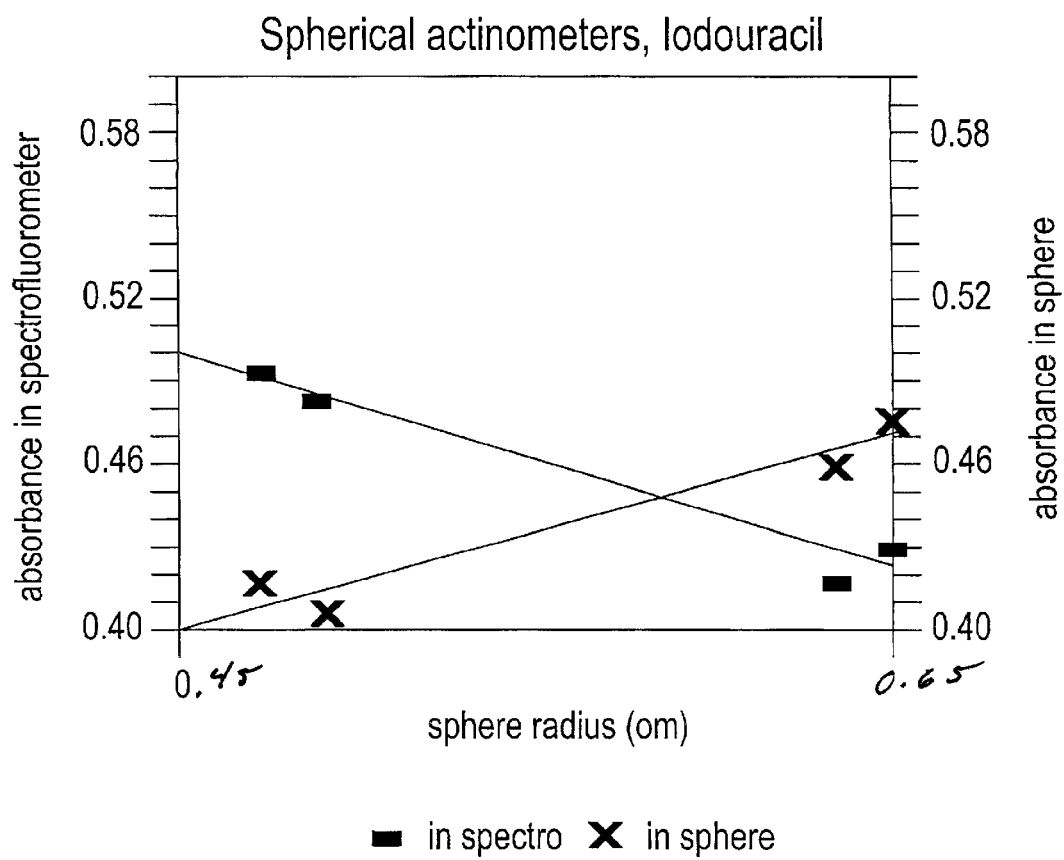
FIG. 3 is a plot of sphere radius vs. absorbance.
Figure 4:
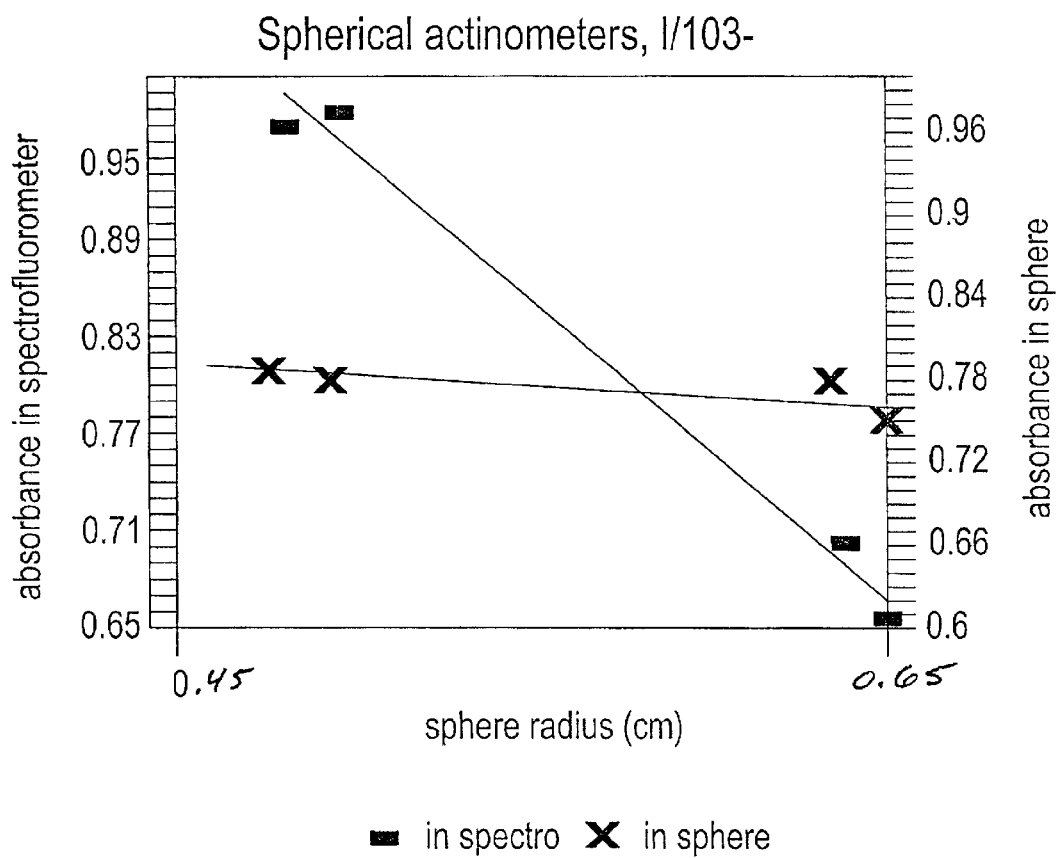
FIG. 4 is a plot of sphere radius vs. absorbance.

One unique feature of the I/I03-actinometer system at the mercury 254 um line which is widely used for disinfection is that, due to the almost total opacity of the actinometric solution at that wavelength, light absorption as measured via a colorimeter in spheres in which the actinometric solution is mixed before colorimetry is independent of sphere diameter. Two similar experiments to support that claim and to show that it is not a general property of actinometers were performed: one with the system mentioned above, the other with an iodouracil actinometer irradiated with a sunlamp. In each experiment, all four spheres received equal irradiation. The results are shown in FIGS. 3 and 4. We chose the latter system because it seemed unlikely to be opaque to the wavelength used for irradiation, which is primarily in the UVB range. From the plot of the I/I03-system, it is evident that the absorbance in the spectrophotomer, which uses a 1 cm light path for all samples, is much smaller in the larger spheres, whereas the absorbance in the spheres differs very little. In the case of an actinometric solution that absorbs no light from the beam of irradiating UV, all solution in spheres of any size would receive the same irradiation, and one would expect the absorbance measured in the spectrophotomer not to differ with sphere size. Of course, if no light were absorbed, no photochemistry could be induced, so zero absorption is a limiting case. What we observed with the iodouracil system was not independence of absorbance in the spectrophotometer, but rather a weaker dependence than in the case of the I/I03-system. This is consistent with some absorption of the irradiating UV by the iodouracil system, but less than in the case of the I/I03-system. As expected, photometry in the spheres is not independent of sphere size with the iodouracil system, in contrast with the system that is the claimed herein.

Though the absorbances were different in the two experiments, the scales of both FIGS. 3 and 4 were adjusted so that the values at the top vs the bottom of each Y-axis are approximately in a 3 to −2 ratio, so as to make the plots easily comparable.

We have utilized this information to create an absorbance measurement kit utilizing the spherical quartz actinometers and a photometer for reading such actinometers. The photometer is shown in FIG. 1 and comprises, an LED at 470 nm powered by a current controller, a solid state photodetector or light sensitive diode. The analog voltage signal of the photodetector is converted to a digital signal which can be processed with a microprocessor programmed to yield fluence on the basis of the measured absorbance as indicated by the photodetector output. The LED may be positioned at one end of a tube having an exit aperture proximal the spherical actinometer with the tube coaxial with the diameter of the actinometer, the center of the LED, and the center of the photodetector which is on the opposite side of the actinometer from the tube normal the diameter of the actinometer. In operation, upon initiation by the start button the microprocessor will instruct the analog to digital converter to begin a series of conversions at a time subsequent to the illumination of the LED. The conversions are summed and scaled for display on a screen or other human sensible indicator. A simple device such as a clock motor may also be included to rotate the actinometer during the series of conversions to reduce the effect of any physical aberrations in the vessel.

The formation of triiode can be "vizualized" using thyodene to complex with triiodene to form the starch-iodine complex which absorbs at 470 nm, thus, a kit contains a powdered mix of iodine, iodate, thyodene and borax, a set of spherical actinometers, and the photometer. The user can add a prescribed amount of water to the mix, place the resulting solution into the actinometers and expose them to UV in the area of interest. The actinometers should be read before and after exposure, yielding a measurement of change in absorbance from which fluence could be calculated in a straightforward manner using the relation: fluence (mJ per cm sq.)=ΔAbs (470 nm)×K×0.6 ml/cm sq. K is equal to approximately 22.5 for 254 nm at 25° C. The kits would be useful in any situation wherein UV is used as a germicidal disinfectant. By way of example the kits may be used to determine fluence in operating rooms, UV treatment rooms, UV water processing reactors, or any other use wherein UV is being used for disinfection or degradation, particularly involving multiple lamps. Further, actinometers designed in accordance with this disclosure may be utilized to mimic the motion of a particle passing through the UV field to determine the exposure in such situations. One example is the use of spherical actinometers entrained in a fluid passing through a UV field as in a water treatment facility. An additional advantage of making measurements in spherical actinometers, is that one can repeatedly irradiate a sample and take measurements without removing contents. Hence, a dose response curve can be obtained on single sample.

Having thus described my invention, it should be understood that the forgoing description is intended for illustration and not by way of limitation of the invention which is set forth in the appended claims.

What we claim is:

1. Apparatus for measuring the UV fluence in a space comprising a spherical containment vessel of any given size appropriate for the space in which UV fluence is to be measured having a UV transmissively passive spherical wall containing an actinometric fluid of iodine and iodate at a pH of about 9.25 that is optically opaque at a known wave length said spherical vessel serving as an omni-directional irradiation vessel and as an omnidirectional colorimitry measurement vessel.

2. An apparatus as defined in claim 1 wherein said actinometric fluid is an aqueous mixture of iodine and iodate that is optically opaque at 254 nm but insensitive to radiation above 330 nm.

3. An apparatus as defined in claim 1 wherein said spherical containment vessel is made from quartz.

4. An apparatus as defined in claim 1 wherein said spherical containment vessel has a volume of less than about 1 cubic centimeter.

5. An as defined in claim 1, wherein said actinometric fluid comprises a aqueous solution having a molar concentration of iodide and iodate of about 3:%.

6. An apparatus as defined in claim 1 comprising a calorimeter operatively configured to measure absorbance of light passing through said spherical containment vessel and actinometric fluid therein for determination of UV fluence independently of the containment vessel dimension.

7. Apparatus as defined in claim 6, further comprising a plurality said spherical containment vessels containing said actinometric fluid dispersed within a volume of said space for irradiation and subsequent measurement of absorbance therein with said calorimeter to determine fluence in said volume.

8. Apparatus as defined in claim 7 wherein said spherical containment vessel and said actinometric fluid therein have a net neutral buoyancy relative to water for dispersion of said plurality of spherical of containment vessels in a volume of water for irradiation within said volume of water and subsequent measuring of fluence throughout the volume.

9. A method of determining UV fluence in a space comprising the steps of preparing a plurality of spherical actinometers of indeterminate dimension containing and actinometric solution therein of iodine and iodate at a pH of about 9.25 that is optically opaque at a wave length of 254 nm; dispersing said actinometers throughout said volume for a known time; measuring the change in transmissiveness of the actinometer after said period of time; and calculating the fluence using the relation: fluence (mJper cm$^2$)=$\Delta$Abs (470 nm)$\times$K$\times$0.6 ml/cm$^2$ where K is a constant for the wavelength.

* * * * *